United States Patent [19]

Jain et al.

[11] Patent Number: 5,077,661
[45] Date of Patent: Dec. 31, 1991

[54] ASSIGNMENT-DEPENDENT RESOURCE ALLOCATION METHOD

[75] Inventors: Shailendra K. Jain; Paul F. Williams, both of Sunnyvale, Calif.

[73] Assignee: Hewlett-Packard Company, Palo Alto, Calif.

[21] Appl. No.: 346,850

[22] Filed: May 3, 1989

[51] Int. Cl.$^5$ .................. G06F 15/20; G06G 7/48
[52] U.S. Cl. ............................ 364/402; 364/474.15
[58] Field of Search ....................... 364/402, 474.15

[56] References Cited

U.S. PATENT DOCUMENTS

| 4,642,766 | 2/1987 | Funk et al. | 364/402 |
| 4,744,026 | 5/1988 | Vanderbei | 364/402 |
| 4,744,027 | 5/1988 | Bayer et al. | 364/402 |
| 4,744,028 | 5/1988 | Karmarkar | 364/402 |
| 4,885,686 | 12/1989 | Vanderbei | 364/402 |
| 4,944,386 | 5/1990 | Freedman et al. | 364/402 |

*Primary Examiner*—Dale M. Shaw
*Assistant Examiner*—Laura Brutman

[57] ABSTRACT

An iterative, assignment-dependent, method of allocating manufacturing resources to perform operations required in the manufacture of multiple products provides for improved conformance with actual manufacturing situations and for solutions which approximate optimal allocation while requiring only modest computational power and time. The first step involves attributing complex costs to potential assignments of operations to resources. Complex costs include two components, combined money-costs and combined times. Combined cost is an assignment dependent variable which can equal operational cost or the sum of operation cost and set-up cost depending on assignments that have already been made. Combined time is likewise assignment dependent. In a second step, combined cost is selected as a parameter to evaluate each potential operation-resource pair. In a third step, a lowest cost and a second lowest cost resource are determined for each unassigned operation. In a fourth step, a maximum penalty operation is identified by finding the maximum difference between lowest and second lowest costs. In a fifth step, the maximum penalty operation is assigned to its lowest cost resource. In a sixth step, combined costs are re-evaluated to take the most recent assignment into account. In a seventh step, iteration is continued by returning to the third step until all operations have been assigned to resources. Once all operations have been assigned, the assignments are reported as a solution to the allocation problem. The inventive method readily handles capacity constrained resource allocation problems, which are difficult or impossible to solve with conventional techniques.

7 Claims, 1 Drawing Sheet

ASSIGNMENT-DEPENDENT RESOURCE ALLOCATION METHOD

BACKGROUND OF THE INVENTION

The present invention relates to manufacturing and, more particularly, to the allocation of manufacturing resources in the manufacture of products.

A major challenge for manufacturing is the optimal allocation of resources to the production of multiple products when there are many choices for such allocation. Resource allocation problems need to be addressed periodically, e.g., daily, weekly, monthly, by any complex manufacturing environment. Resource allocation problems have been formalized by defining for each product a set of operations, as well as required resources for performing these operations, which must be performed for its manufacture. One formalization is referred to as the "Generalized Assignment Problem" or "GAP". In the GAP formalization, an operational cost and an operational time are assigned to the performance of a given operation on a given resource, i.e., to a given operation-resource pair. An objective, such as cost minimization, is then selected. Alternatively, assignments can be made with the objective of minimizing the total manufacturing time. More generally, both time and cost are taken into account. For example, in a "capacity-constrained resource problem", assignments can be made with the objective of minimizing cost but completing manufacturing by a certain deadline.

The generalized assignment problem has been studied very extensively. It is solvable using straight forward techniques, provided the number of variables is small or where capacity constraints are absent or so lax as to be negligible. For example, it is impracticable to solve a capacity-constrained generalized assignment problem optimally where there are, for instance, 20 or more resources, 500 or more products, an average of 10 or more operations per product, and an average of 5 or more resources compatible with each operation. Given a problem of this magnitude, a typical manufacturing deadline could pass before a computer generated the optimal solution.

A more basic problem is that the formalization of a real manufacturing situation as a generalized assignment problem is an oversimplification which can introduce considerable error between the calculated solution and the actual optimal allocation. To illustrate this, consider a situation where an operation is to be performed on a resource which has just been used to complete the previous operation for the same product. Compare this to the situation where the operation to be performed on a different but identical resource. In one case, the product is already in place for the operation to be performed, in the other case, the product must be moved and configured for the second resource. The movement incurs a cost which is not incurred when a single resource is used for successive operations. This demonstrates that the cost of performing an operation on a resource can depend on what other operations have been assigned to that resource. The generalized assignment problem does not take this dependence into account, and thus its solutions are potentially compromised. While there may be ad hoc approaches to dealing with this compromise, such methods have not provided elegant optimal or near-optimal solutions.

What is needed is an improved method for allocating manufacturing resources. The improved method should include a formalization which takes into account dependencies in the time and cost of the assignment of an operation to a resource. Specifically, the formalization should take into account dependencies of one assignment on other assignments of operations to resources. Furthermore, the method should permit problems of realistic complexity to be solved in a reasonable time using affordable computational resources.

SUMMARY OF THE INVENTION

In accordance with the present invention, an improved resource allocation method combines an assignment-dependent formalization with an iterative minimum penalty heuristic including a re-evaluation step. The inventive method is referred to as the "assignment-dependent resource allocation method" or "ADRAM". This method approximates, in a reasonable time, an optimal solution to a formalization which responds to the limitations reported by users of the generalized assignment problem formalization.

Since the present invention involves mathematical operations which can be cast in widely different but mathematically equivalent expressions, the scope of the present invention is defined in terms of equivalents of a particular expression. Those skilled in the art will recognize that equivalent formalizations can use different numbers of steps, different combinations of operations with steps, and different expressions for operations. Some of these are investigated by example below. However, mathematical techniques can resolve unambiguously the question of mathematical equivalence of methods for the purpose of determining the scope of the present invention.

ADRAM shares certain formal characteristics with the generalized assignment problem formalization. Plural products are to be manufactured on plural resources. A respective set of one or more operations must be performed on the resources for the product's manufacture. Each operation is compatible with, i.e., can be performed on, at least one resource. The objective of ADRAM is to assign all operations to compatible resources to meet some objective or to optimize some parameter.

Complex cost can be used in formalizing an ADRAM problem. In a typical capacitated resource allocation problem, the objective is to minimize cost within certain resource availability limitations expressed in time. However, ADRAM is equally applicable to minimizing time within set money-cost constraints. In this sense, cost and time are formally interchangeable. Alternatively, a problem can be stated in terms of minimizing a combination of time and money under both time and money constraints. These constraints are incorporated into the parameter definition for the heuristic employed in the ADRAM. While ADRAM problems can be formalized in terms of complex cost, there is always an alternative formalization in which time and money are treated separately.

In ADRAM, operations are assigned to resources one at a time. At any given time, the operations are classified into two sets: an assigned set comprising operations which have already been assigned to resources, and an unassigned set comprising operations which have not yet been assigned to resources. Either set can be empty when the other contains all the operations. Typically, the assigned set is initially empty. Once all operations have been assigned, the unassigned set is empty and a solution is attained. Each assignment of an operation to a resource results in an operation-resource pair. Each operation-resource pair has an associated product-resource pair which contains the product to which the assigned resource belongs and the operation to which it was assigned.

A first step in a seven-step ADRAM heuristic involves attributing a complex cost to each potential assignment of an unassigned operation to a resource. "Complex cost" is an expression for a two-parameter quantity, with one parameter being cost and the other time. Except when qualified by "complex" or when otherwise indicated herein, "cost" refers to simple cost, also referred to as "money-cost" and "cost-in-money". Time is also referred to as "cost-in-time", when contrasted with money-cost as a component of complex cost. Attributing a complex cost is the same as attributing a money-cost and a time to each operation-resource pair. Attribution of complex cost is also a step in the generalized assignment problem, although it is not usually expressed in this way. The objective of ADRAM is to maximize complex-cost effectiveness, i.e., manufacturing effectiveness taking into account both total cost and total manufacturing time.

In ADRAM, the attribution of complex cost is assignment dependent, whereas in GAP it is not. The term "attribution" is used to encompass arbitrary assignments and calculations, both of which can be used to derive the complex costs that are assigned. Assignment dependence implies that there is at least one operation-resource pair that has at least two different complex costs which can be attributed to it depending on the contents of the current assigned set. Since the assigned set defines a mapping of operations to resources, each assigned set corresponds to a respective assignment map. Thus, assignment dependence implies that complex cost varies as a function of the current assignment map. Another approach to assignment dependence is that the complex cost of a potential assignment is dependent on the prior history of assignments. In addition, assignment-dependence implies that complex cost for a given potential operation-resource pair is well-defined given the current assignment.

In GAP, cost and time attribution are not assignment dependent. Each operation-resource pair has an operational cost and an operational time which are irrespective of the other assignments. In a sense, GAP represents a degenerate case of the ADRAM formalization; although this degenerate case is excluded from the scope of the present invention since there are no variations by assignment map. However, the degeneracy relationship helps explain the superiority of the ADRAM formalization in providing a correspondence to reality; ADRAM has an additional degree of freedom--that of specifying how complex cost depends on prior assignments.

For example, the ADRAM formalization permits one to take into account assignment-dependent set-up costs and set-up times in optimizing resource allocation, while GAP does not. Herein, costs which are conventionally referred to as "set-up" costs, but which are not assignment dependent, are included in operational costs. Likewise, assignment-independent set-up times are included in operational times. Hereinunder, "set-up" refers exclusively to assignment-dependent set-up costs and times.

In a second step, potential assignments are evaluated according to a parameter which relates to manufacturing effectiveness. The parameter, which must be a function of complex cost, can be cost, time, a function of cost alone, a function of time alone, or a function of both cost and time. For example, if cost is the parameter, each potential assignment can be evaluated to determine its cost. In the case of cost, this evaluation is very simple: cost is simply the first component of complex cost. The parameter can reflect capacity constraints by assigning a high or infinite time-component value when the usage of a resource exceeds its availability threshold. Generally, evaluation of a potential assignment according to a selected parameter results in a parameter value.

In a third step, a most effective resource and a second most effective resource are determined for each operation. The parameter is selected so that it is negatively correlated with effectiveness. For example, increased cost and increased time correspond to a less effective allocation of resources. For a given operation, the resource associated with the lowest parameter value is the most effective resource $R_1$, i.e., the best resource for performing that operation ignoring other constraints. Likewise, the resource associated with the second lowest parameter value is the second most effective resource $R_2$. The detriment incurred by selecting the second most effective resource for an given operation in favor of first most effective resource defines the "penalty" associated with that operation.

In a fourth step, the unassigned operation associated with the maximum penalty is identified. Associated with the selected parameter is a comparison function. Where the selected parameter varies linearly with effectiveness, the comparison function can yield a difference (subtraction). Otherwise, a quotient (division), or some other comparison function can be used. The comparison function is used to generate a comparison value for each operation by comparing its lowest and second lowest parameter values. This comparison value is a measure of the penalty that would apply to the selection of the second most effective resource instead of the most effective resource for a given parameter. The greatest comparison value corresponds to the greatest penalty; the associated operation is identified in this step as the maximum penalty operation.

In a fifth step, the maximum penalty operation is assigned to its most-effective resource. This assignment avoids the greatest penalty. Assignment of the maximum penalty operation moves it from the unassigned set to the assigned set. A new assignment map, including the new operation-resource pair, is established.

In a sixth step, any required adjustments in complex costs attributed to potential assignments are made. Changes in complex costs require adjustments in parameter values. The changes can be incremental or, in the case of a capacity constraint dramatic. Assignment dependence requires that such an adjustment occur at least once during the series of assignments leading to a solution. However, some assignments may not require any adjustments. Therefore, re-evaluation can be considered conditional for a given operation, although required at least once during execution of the method.

In a seventh step, the third through sixth steps are iterated. Iteration ceases when all operations have been assigned to resources, in which case a final assignment map is reported. In addition, a sum of the parameters values associated with each assignment can be reported as a measure of the overall effectiveness of the solution represented by the final assignment map. Iteration also can be halted whenever an operation is determined to be incompatible with available resources. In this case, the incompatibility can be reported.

The major distinction between the ADRAM problem formalization and the GAP problem formalization is assignment dependence. The present invention couples the ADRAM formalization with the described minimum-maximum, "minimax" penalty heuristic to provide a practicable solution. While minimax penalty, and related "minimum regret" heuristics are known, the present invention adapts the heuristics by including the re-evaluations required by assignment dependence.

The ADRAM solution will not always be strictly optimal. However, it will be a practically attainable solution which serves as a good approximation of optimal. Simulations with sample data indicate that, for the majority of problems, ADRAM provides a solution within 2% of optimality. Furthermore, solution time is basically linearly dependent on the number of operations to be performed. This contrasts with integer programming-based approaches, in which solution time increases exponentially with the number of operations. Therefore, the advantages of the present invention become more significant when handling the large problems found in practical settings.

The combination of the assignment-dependent formalization and the minimum penalty heuristic yields a resource allocation method which provides a better conformance to reality and faster solutions. The better conformance is due to the extra degree of freedom inherent in assignment dependence. The faster solution is due to the straightforward sequential assignment of operations to resources, which demands little in terms of mathematical complexity compared to integer programming based solutions. Capacity constraints are readily handled by successive heuristics applying respective parameters of varying sensitivity to these capacity constraints. These and other features and advantages of the present invention are apparent in the description below with reference to the following drawing.

DESCRIPTION OF THE PREFERRED EMBODIMENTS

Figure 1:
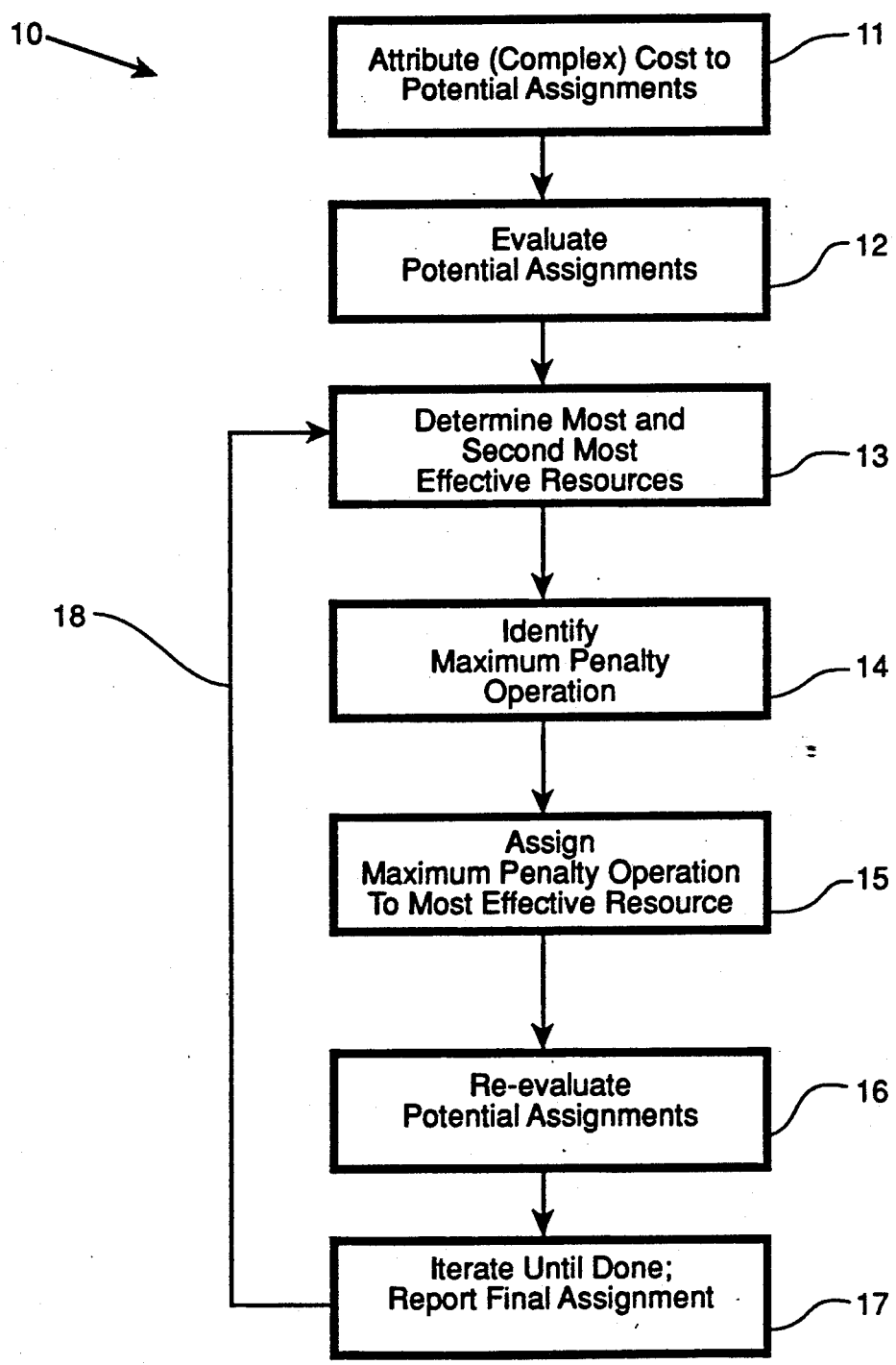
FIG. 1 is a flow chart in accordance with the method of the present invention.

An assignment-dependent resource allocation method 10 can be characterized by a sequence of steps 11-17 embodying an iterative loop 18. The first step 11 is to attribute a complex cost to potential assignments of unassigned operations to available resources. Expressions of the method need not refer explicitly to complex cost: an equivalent formulation attributes cost and time to each potential assignment. The second step 12 involves evaluation of potential assignments according to a parameter which is a function of complex cost, i.e., a function of cost and/or time. The third step 13 is to determine the most and second most effective resources for each unassigned operation. The fourth step 14 is to identify the maximum penalty operation. The fifth step 15 is to assign the maximum penalty operation to its most effective resource. The sixth step 16 is to re-evaluate potential assignments, in the light of the assignment in the preceding step. The seventh step 17 initiates iterative loop 18 to third step 13 as long as there are unassigned operations and available, compatible resources.

Once all operations are assigned, the final assignment map is reported. Preferably, the incompatibility of an unassigned resource with any available operation is also reported as a failure to converge on a solution.

To help define the concepts involved in ADRAM, a simple example is presented. $P_1$ and $P_2$ are two products to be manufactured. The manufacture of $P_1$ requires the performance of three operations, $Q_{11}$, $Q_{12}$, and $Q_{13}$. The manufacture of $P_2$ requires the performance of two operations, $Q_{21}$, and $Q_{22}$. Available for manufacturing products $P_1$ and $P_2$ are three resources $R_1$, $R_2$, and $R_3$. Any operation can be performed on any resource with the restrictions that $Q_{11}$ cannot be performed on $R_2$ and $Q_{22}$ cannot be performed on $R_3$.

The performance of operation $Q_{11}$ on resource $R_1$ costs three dollars and takes four minutes. This can be expressed as $M^o_{111}=3$ and $T^o_{111}=4$, where M stands for money-cost and T stands for time-cost. More generally, $M^o_{pqr}$ stands for the operational cost of performing the $q^{th}$ operation of the $p^{th}$ product on the $r^{th}$ resource, and $T^o_{pqr}$ stands for the operational time for performing the same action. Together, $M^o_{111}$ and $T^o_{111}$ define an operational complex cost $C^o_{111}=(3,4)$. More generally, $M^o_{pqr}$ and $T^o_{pqr}$ define an operational complex cost $C^o_{pqr}$.

Herein, mathematical expressions use boldface, "P", "Q", and "R" to represent real entities, e.g., products, operations and resources, as well as variables representing such real entities. Numbers representing the total count or total corresponding to a real entity show the letter corresponding to that entity without bolding. For example, there are P products $P_p$, where $P=2$ and p is an index which can equal 1 or 2. Similarly, there are $R=3$ resources $R_r$ in the foregoing example. Index variables are shown in lower case versions of the entity to which they refer. $Q_{pq}$ represents the $q^{th}$ operation associated with the pth product.

The cost of manufacturing products $P_1$ and $P_2$ includes operational complex costs for each operation. However, the sum of the complex costs is not the total cost of manufacturing. Generally, there are efficiencies in performing several operations for one product on a single resource. The complement to this is that there is a cost associated with using multiple resources to manufacture a single product. In particular, there is a set-up cost $M^s_{11}$ of ten dollars to set up product $P_1$ on resource $R_1$ and a set-up time $T^s_{11}$ of five minutes required to set up product $P_1$ on resource $R_1$. In other words, there is a set-up complex cost $C^s_{11}=(10,5)$ associated with the set-up of product $P_1$ on Resource $R_1$. More generally, there is a set-up complex cost $C^s_{pr}=(M^s_{pr}, T^s_{pr})$ associated with setting up product $P_p$ on resource $R_r$. This set up complex cost is incurred only when at least one operation for product $P_p$ is performed on resource $R_r$ and is incurred at most once, even when multiple operations of product $P_p$ are performed on resource $R_r$.

Initially, no operation is assigned to any resource. The resource allocation problem is solved when all operations are assigned to resources. ADRAM approaches the solution iteratively. Each iteration involves the assignment of one operation to a compatible resource. In the present example, there will be five iterations because there are five operations to be assigned. ADRAM requires re-evaluations during at least some iterations to adjust the value of a complex cost which is assignment dependent. The operational complex costs and the set-up complex costs defined above are not assignment dependent. However, operational and set-up costs are combined in an assignment dependent manner to yield an assignment dependent complex cost as follows.

A combined complex cost $C_{pqr}=(M_{pqr}, T_{pqr})$ is associated with the assignment of operation $Q_{pq}$ to resource $R_r$. $C_{pqr}=C^o_{pqr}+C^s_{pr}$ if $Q_{pq}$ is the first operation of product $P_p$ to be assigned to resource $R_r$. $C_{pqr}=C^o_{pqr}$ when another operation of product $P_p$ has been assigned to resource $R_r$. Thus the combined complex cost $C_{111}$ for the first operation of product $P_1$ when performed on resource $R_1$ is (13,9) unless, previously, either $Q_{12}$ or $Q_{13}$ has been assigned to resource $R_1$. In this latter case, $C_{111}=C^o_{111}=(3,4)$. Thus combined complex cost $C_{111}$ is assignment dependent.

Resource allocation methods attempt to provide an optimal allocation of resources. The criterion for "optimal" is situation dependent. It may be optimal to minimize total manufacturing money-cost. It may be optimal to minimize manufacturing time. More commonly, both time and money must be taken into the definition of optimal. For example, optimal may mean manufacturing products within a fixed amount of time for minimum cost. In the example, a minimum money-cost is sought with the proviso that total manufacturing time must not exceed one hour. If the lowest cost allocation requires more than one hour, it is not optimal; otherwise, it is optimal.

Once a criterion is selected, ADRAM requires that it be represented by a parameter V. This parameter V is a function of combined complex cost that can be used to assign a unique value $V_{apqr}$ to the assignment of an operation $Q_{pq}$ to resource $R_r$ given an existing assignment map $A_a$. V can be combined money-cost, combined time, the product of combined money-cost and combined time, money-cost divided by time remaining before a deadline or resource capacity exceeded, or any number of other parameters. For the simplified example, the parameter is combined money-cost.

Once parameter V is selected, the iterative assignment process can begin. Typically, and in the present case, there are no assignments initially. Alternatively, ADRAM can be applied to case where some assignments are mandated. In either case, there is an original assignment map $A_0$. In the typical case, assignment map $A_0$ includes no assignments. The first iteration establishes the first assignment map $A_1$. The subscript can indicate the number of iterations completed and, typically, the number of operations assigned.

Since, in the example, there are five operations to be performed in manufacturing products $P_1$ and $P_2$, there will five iterations of the heuristic. Assignment map $A_5$ will be the ADRAM solution, while assignment maps $A_1$–$A_4$ represent partial solutions. Each assignment is selected on the basis of parameter values $V_{apqr}$ associated with each of the operations-resource pairs. Since time is of secondary importance for the sample problem, the following table includes operational money-cost and set-up money-costs used to calculate combined costs. More generally, such a table would also include times.

| Set-up and Operational Costs for $P_1$ and $P_2$ | | | | | | |
|---|---|---|---|---|---|---|
| | Product $P_1$ | | | | Product $P_2$ | |
| | $P_1$ | $Q_{11}$ | $Q_{12}$ | $Q_{13}$ | $P_2$ | $Q_{21}$ | $Q_{22}$ |
| $R_1$ | 10 | 4 | 3 | 6 | 20 | 6 | 8 |
| $R_2$ | 30 | X | 4 | 3 | 20 | 5 | 2 |

-continued

| Set-up and Operational Costs for $P_1$ and $P_2$ | | | | | | |
|---|---|---|---|---|---|---|
| | Product $P_1$ | | | | Product $P_2$ | |
| | $P_1$ | $Q_{11}$ | $Q_{12}$ | $Q_{13}$ | $P_2$ | $Q_{21}$ | $Q_{22}$ |
| $R_3$ | 30 | 4 | 1 | 4 | 10 | 2 | X |

X denotes that an operation cannot be performed on a resource. Set-up costs are listed in columns with the headings $P_1$ and $P_2$, while operational costs are listed in the "Q" columns. This table provides the attribution of complex cost required in first step 11. Note that it is not necessary to calculate the complex cost to have it attributed. All that is required is that the data and procedure for calculating complex cost be defined.

The "complex cost" table can be used to generate a table for combined money-cost $M_{pqr}$ for each assignment map. In this example, combined money-cost is the parameter V referred to in second step 12. The table $V_0$ for parameter V given the initial assignment map $A_0$ is:

TABLE $V_0$

| | Product $P_1$ | | | Product $P_2$ | |
|---|---|---|---|---|---|
| | $Q_{11}$ | $Q_{12}$ | $Q_{13}$ | $Q_{21}$ | $Q_{22}$ |
| $R_1$ | 14 | 13 | 16 | 26 | 28 |
| $R_2$ | X | 34 | 33 | 25 | 22 |
| $R_3$ | 34 | 31 | 34 | 12 | X |
| D | 20 | 18 | 17 | 13 | 6 | where the initial assignment map is:

| Assignment Map $A_0$ | |
|---|---|
| $Q_{11}$ | unassigned |
| $Q_{12}$ | unassigned |
| $Q_{13}$ | unassigned |
| $Q_{21}$ | unassigned |
| $Q_{22}$ | unassigned |

In accordance with third step 13, operation $Q_{11}$ can be performed at the lowest combined money cost of 14 dollars on resource $R_1$. Not performing $Q_{11}$ on $R_1$ would incur require a performance money-cost of at least 34 dollars on $R_3$. The penalty for not assigning $Q_{11}$ to its lowest cost resource is 20 dollars, as indicated by difference D in the above table for assignment map $A_0$. The penalties for each of the operations are listed. The twenty-dollar penalty associated with operation $Q_{11}$ is the largest of the penalties associated with the operations. Thus, $Q_{11}$ is the maximum penalty operation of fourth step 14. Minimizing penalty means, in effect, avoiding the largest penalties. The minimum penalty heuristic thus assigns the greatest penalty operation $Q_{11}$ to its lowest cost resource $R_1$.

The assignment of operation $Q_{11}$ to resource $R_1$ creates a new assignment map $A_1$ which contains this assignment as its sole element. This assignment also necessitates a revision of the table for combined money cost:

TABLE $V_1$

| | Product $P_1$ | | Product $P_2$ | |
|---|---|---|---|---|
| | $Q_{12}$ | $Q_{13}$ | $Q_{21}$ | $Q_{22}$ |
| $R_1$ | 3 | 6 | 26 | 28 |
| $R_2$ | 34 | 33 | 25 | 22 |
| $R_3$ | 31 | 34 | 12 | X |

TABLE V$_{1}$-continued

|   | Product P$_1$ | | Product P$_2$ | |
|---|---|---|---|---|
|   | Q$_{12}$ | Q$_{13}$ | Q$_{21}$ | Q$_{22}$ |
| D | 28 | 27 | 13 | 6 | where the corresponding assignment map A$_1$ is:

| Assignment Map A$_1$ | |
|---|---|
| Q$_{11}$ | R$_1$ |
| Q$_{12}$ | unassigned |
| Q$_{13}$ | unassigned |
| Q$_{21}$ | unassigned |
| Q$_{22}$ | unassigned |

Table V$_1$ differs from Table V$_0$ in two significant respects. First, there is no column for Q$_{11}$, which has been assigned and therefore cannot be considered for the next assignment. Second, the combined costs associated with the assignments of Q$_{12}$ and Q$_{13}$ to resource R$_1$ have been re-evaluated, in accordance with sixth step 16, to take into account the assignment represented in map A$_1$. In particular, set-up times have been subtracted from the corresponding table entries.

Seventh step 17 then initiates iterative loop 18. New assignment map A$_1$ and the corresponding combined costs are then used in the second iteration of third step 13. The changes in combined costs greatly increase the favorability of assigning a product P$_1$ operation to resource R$_1$ to avoid additional set-up time. Examination of the difference row D indicates an assignment of Q$_{12}$ to resource R$_1$ to incur minimum penalty.

Assignment of Q$_{12}$ to R$_1$ causes the column corresponding to Q$_{12}$ to be removed in the table for map A$_2$. No entries in row R$_1$ are changed. The row R$_1$ column Q$_{13}$ is not changed because set-up time is not included in this entry. Row R$_1$ columns Q$_{21}$ and Q$_{22}$ are not changed because they represent operations of product P$_2$ rather than product P$_1$ to which assigned operation Q$_{12}$ belongs. Thus, no recalculation is required at this iteration. While the invention requires value adjustments for at least one step, adjustments are not required at every step. Table V2 represents the results after two iterations of the heuristic.

TABLE V$_2$

|   | Product P$_1$ | | Product P$_2$ |
|---|---|---|---|
|   | Q$_{13}$ | Q$_{21}$ | Q$_{22}$ |
| R$_1$ | 6 | 26 | 28 |
| R$_2$ | 33 | 25 | 22 |
| R$_3$ | 34 | 12 | X |
| D | 27 | 13 | 6 |

The corresponding assignment map A$_2$ is:

| Assignment Map A$_2$ | |
|---|---|
| Q$_{11}$ | R$_1$ |
| Q$_{12}$ | R$_1$ |
| Q$_{13}$ | unassigned |
| Q$_{21}$ | unassigned |
| Q$_{22}$ | unassigned |

Heretofore, the sample case has been treated as though there were no time constraints. In a capacitated resource allocation problem, there are time constraints. R$_1$ may be a resource which is only available part time due to maintenance or other consideration. If Q$_{11}$ and Q$_{12}$ have consumed too much of the time available on R$_1$, then Q$_{13}$ would become incompatible with R$_1$. This is indicated in the revised Table V$_{2'}$ below:

TABLE V$_{2'}$

|   | Product P$_1$ | Product P$_2$ | |
|---|---|---|---|
|   | Q$_{13}$ | Q$_{21}$ | Q$_{22}$ |
| R$_1$ | X | 26 | 28 |
| R$_2$ | 33 | 25 | 22 |
| R$_3$ | 34 | 12 | X |
| D | 1 | 13 | 6 |

This table dictates an assignment of Q$_{21}$ to R$_3$, resulting in Table V$_3$:

TABLE V$_3$

|   | Product P$_1$ | Product P$_2$ |
|---|---|---|
|   | Q$_{13}$ | Q$_{22}$ |
| R$_1$ | X | 28 |
| R$_2$ | 33 | 22 |
| R$_3$ | 34 | X |
| D | 1 | 6 | with the corresponding assignment map A$_3$:

| Assignment Map A$_3$ | |
|---|---|
| Q$_{11}$ | R$_1$ |
| Q$_{12}$ | R$_1$ |
| Q$_{13}$ | unassigned |
| Q$_{21}$ | R$_3$ |
| Q$_{22}$ | unassigned |

These is no recalculation since Q$_{22}$ is incompatible with the resource to which Q$_{21}$ was assigned. On this fourth iteration, Q$_{22}$ is assigned to its lowest cost resource R$_2$, resulting in assignment map A$_4$.

| Assignment Map A$_4$ | |
|---|---|
| Q$_{11}$ | R$_1$ |
| Q$_{12}$ | R$_1$ |
| Q$_{13}$ | unassigned |
| Q$_{21}$ | R$_3$ |
| Q$_{22}$ | R$_2$ |

On the fifth iteration, Q$_{13}$ is assigned to R$_2$. The solution is the final map A$_5$:

| Assignment Map A$_5$ | | |
|---|---|---|
| Operation | Resource | Cost |
| Q$_{11}$ | R$_1$ | 14 |
| Q$_{12}$ | R$_1$ | 3 |
| Q$_{13}$ | R$_2$ | 33 |
| Q$_{21}$ | R$_3$ | 12 |
| Q$_{22}$ | R$_2$ | 22 |
| Total | | 84 |

In accordance with seventh step 17, assignment map A$_5$ is reported. The total cost of manufacturing products P$_1$ and P$_2$ is $84.

While the foregoing example is illustrative of certain of its facets, the present invention is most advantageously used with problems involving many more variables. In the preferred embodiment of the present invention, both time and cost are tracked through each assignment. Time serves to define capacity limitations for the resources. The minimum penalty heuristic is applied multiple times using different parameters, and the results are compared.

FORMALIZATION: CAPACITATED PROBLEM WITH SET-UP

A preferred formalization for a capacitated manufacturing resource problem defines an optimal resource allocation as one that minimizes total money-cost, while observing capacity limitations on resources and taking set-up costs and times into account along with operational costs and times. In other words, the objective is to minimize V, where:

$$V = \sum_{p=1}^{P} \sum_{q=1}^{Q} \sum_{r=1}^{R} M^o_{pqr} X_{pqr} + \sum_{p=1}^{P} \sum_{r=1}^{R} M^s_{pr} Y_{pr} \quad (1)$$

subject to:

$$\sum_{q=1}^{Q} \sum_{p=1}^{P} T^o_{pqr} X_{pqr} + \sum_{p=1}^{P} T^s_{pr} Y_{pr} \leq B_r \text{ for all } r \quad (2)$$

$$\sum_{r=1}^{R} X_{pqr} = 1 \text{ for all } p, q, \quad (3)$$

$$X_{pqr} \leq Y_{pr} \text{ for all } p, q r \quad (4)$$

$$X_{pqr} = 0 \text{ or } 1 \quad (5)$$

$$Y_{pr} = 0 \text{ or } 1 \quad (6)$$

Expression 1 describes the total production cost including operational costs and set-up costs. The symbols of expression 1 are used as follows:

p is the product index;
P is the total number of products;
q is the operation index; a term with this index is zero when q exceeds the number of operations associated with the product;
Q is the maximum number of operations associated with any product;
r is the resource index;
R is the number of resources;
$M^o_{pqr}$ is the operational money-cost associated with the performance of the $q^{th}$ operation of product p on resource r.
$M^s_{pr}$ is the set-up money-cost associated with the set-up of product p on resource r. This is an assignment-dependent variable and is distinguished from a set-up cost component of operational money cost, which is not assignment dependent.
$X_{pqr}$ is the operation-resource allocation integer variable which assumes a value of 1 when operation q of product p is assigned to resource r and assumes a value of 0 otherwise; the binary character of this variable is defined in expression 5; and
$Y_{pr}$ is the product-resource allocation integer variable which assumes a value of 1 when any operation of product p is assigned to resource r and assumes a value of 0 otherwise; the binary character of this variable is defined in expression 6.

Expression 2 requires that resource capacity constraints be met. While listed as an equation, it is preferable to treat the relationship as greater than "$\geq$" in an optimal iterative solution procedure. Variables included in expression 2, other than those just defined, are defined as follows:

$T^o_{pqr}$ is the operational time associated with performance of the $q^{th}$ operation of product p on resource r;
$T^s_{pr}$ is the set-up time associated with performance of any operation of product p on resource r; and
$B_r$ is the total production time available for resource r.

Expression 3 requires that all operations be performed. Expression 4 requires that set-up costs be attributed when a product is first assigned to a resource. Note that while complex cost is not made explicit in this formalization, it is implicit in the use of its components: money-cost and time. However, as the heuristics make clear, the assignment dependence appears in the form of the recalculations after each assignment is made.

As indicated above, ADRAM requires selection of a parameter (i.e., cost, time, cost-time product) to evaluate possible operation-resource pairings. Since it may be difficult to determine a priori which parameter will result in the best solution, five different parameters are provided. The heuristic can be applied to the same data using each of the parameters to obtain different results. The results can be compared to select a best result. The five parameters respectively represent: money-cost, time, a cost-time quotient, a cost-time product, and cost-and-remaining-capacity. The application of these parameters is described below.

V = Cost

The cost-based heuristic attempts to minimize total money-cost of production, as defined in expression 1, by assigning operations to resources seriatim. The first operation assigned is the one for which a failure to be assigned to its most cost-effective resource would incur the largest penalty. Once this first assignment is made, a second assignment is made from the remaining operations and resources. This assignment and re-evaluation process is iterated until all operations are assigned, with cost-effectiveness being re-evaluated as necessary after each assignment. This cost-based heuristic can be described more formally as follows.

Step 1. Attribute an operational cost and an operational time to each operation-resource pair; likewise, attribute a set-up cost and a set-up time to each product-resource pair. This is equivalent to attributing a complex cost to each potential operation-resource pair. The complex cost is the vector sum of a combined cost and a combined time for each operation-resource pair. The combined cost is equal to the operational cost plus the set-up cost for a given operation-resource pair when no other same-product operation has been previously assigned to the same resource. Otherwise, combined cost is equal to operational cost. Thus, combined cost is assignment dependent, even though operational cost and set-up cost are not. A similar relationship holds for combined time. Thus, the vector sum of combined cost and combined time, which is complex cost, is assignment dependent.

Step 2M. Evaluate an initial combined cost by adding the set-up cost to operational cost for all compatible operation-resource pairs:

$$M_{pqr} = M^o_{pqr} + M^s_{pr}$$

and assign infinite (very large) cost to incompatible operation-resource and product-resource pairs.

Step 2T. Evaluate an initial combined time by adding the set-up time to operational time for all compatible operation-resource pairs:

$$T_{pqr} = T_{pq}{}^o + T_{pr}{}^s$$

and assign infinite (very large) time to incompatible operation-resource and product-resource pairs.

In a capacitated resource allocation problem, i.e., one in which there are time limitations on resource availability, combined cost is a function of time as well as of cost. Thus, the requirement of step 2T. Prior assignments affect the time available on a given resource. When this time falls below that required for a given unassigned operation to be performed on that resource, the resulting incopatibility affects the next assignment. The heuristic can represent the incompatibility by an incompatibility status flag, e.g., "X" in table $A_o$ above, or by setting combined cost a infinity or some very large number.

In a capacity-constrained problem, the parameter really has three potential components, an operation cost, a set-up cost and a cost tied to available capacity. The parameter can be considered a capacity-qualified combined cost. The last cost can be zero or infinite depending on whether capacity is available. Intermediate values can also be provided for where a formula is provided for equating time and money.

Step 3. Determine the most effective and second most effective resources for each unassigned operation. In this case, most effective is equivalent to lowest cost.

Step 4. Find the cost difference $(M_{pq2} - M_{pq1})$ between the minimum cost resource and the second minimum cost resource for all operations. Find the maximum difference over all operattions from step 3. This is the maximum penalty, and the associated operation is the maximum penalty operation. "$M_{pq1}$" designates the money-cost associated with the lowest cost resource for operation q of product p. Likewise, "$M_{pq2}$" designates the money-cost associated with the second-lowest cost resource for operation q of product p.

Step 5. Assign the maximum penalty operation to its maximum effectiveness, i.e., minimum cost, resource.

Step 6. For all other operations which pertain to the product to which the assigned operation belongs and which can be performed on the assigned resource, set combined cost equal to operational cost and set combined time equal to operational time. Reduce the available capacity for the assigned resource by the amount of time taken by the assigned operation. Check for capacity shortage for all remaining operations of all products which are compatible with this resource. Assign infinite (or very large) cost and time to operation-resource pairs for operations that can no longer be performed within the capacity constraints of this resource. Remove the assigned operation from further consideration for assignment in the iterative process.

Step 7. Repeat steps 3–6 until all operations are assigned or until an infeasibility is detected, i.e., no resource is available to perform a given operation. In the latter case, the heuristic has failed to provide a solution. In the former case, all operations have been assigned to resources and capacity constraints. The solution should be near minimum cost. A failure to reach a solution due to lack of resource capacity indicates that a parameter should be selected which is more sensitive to capacity constraints. Of course, no parameter will result in a solution is the problem is truly infeasible.

V = Time

Using time as the parameter tends to minimize manufacturing time. Thus, time is a better parameter than money for problems with tight capacity constraints. Operations are assigned to resources seriatim, as with the cost-based heuristic. However, the objective of each assignment is to avoid time penalties rather than cost penalties. The time based heuristic can be described more formally as follows.

Step 1. Present set-up and operational data that can be used to attribute complex cost. This is the same as for the V=cost embodiment and the three following embodiments.

Step 2. Add the set-up time to operational time for all compatible operation resource pairs and set-up cost to operational cost as in the costbased heuristic. The parameter of interest is capacity-qualified combined time, with the capacity qualification being implicit in the term "compatible".

Step 3. Determine the shortest time (most-effective) and second shortest time resource for each unassigned operation.

Step 4. Find the time difference $(T_{pq2} - T_{pq1})$ between minimum time resource and second minimum time resource for all operations. Find the maximum difference to determine the maximum penalty operation.

Step 5. Assign the maximum penalty operation to its minimum time resource.

Step 6. For all other operations which pertain to the product to which the assigned operation belongs and which can be performed on the assigned resource, set combined cost equal to operational cost and set combined time equal to operational time. Reduce the available capacity for the assigned resource by the amount of time taken by the assigned operation. Check for capacity shortage for all remaining operations of all products which are compatible with this resource. Assign infinite time to operation-resource pairs for operations that can no longer be performed within the capacity constraints of this resource. Remove the assigned operation from further consideration for assignment in the iterative process.

Step 7. Repeat steps 3–6 until all operations are assigned or until an infeasibility is detected, i.e., no resource is available to perform a given operation. In the latter case, the heuristic has failed to provide a solution, probably because the problem is infeasible. In the former case, all operations have been assigned to resources and capacity constraints. The solution should be near minimum time.

V = Cost Time Quotient

The cost-based and time-based heuristics described above are, in a sense, extremes. In the first case, cost is considered without much sensitivity to time and, in the second case, time is considered without regard to cost. In many situations, both time and cost must be considered in finding an optimal production solution. Selecting a parameter which takes both time and money into account can provide an optimal solution when capacity constraints are of intermediate severity. Accordingly, a cost-time-quotient heuristic can be formalized as follows.

Step 1. Presentation of set-up and operational cost and time data from which complex cost can be attributed.

Step 2. Calculate combined money-cost and combined time for all operations. Once again, the complex parameter is capacity qualified.

Step 3. Determine the lowest combined cost resource for each operation.

Step 4. Calculate the comparison $D_{pq}=(M_{pq2}-M_{pq1})/T_{pq1}$ for all operations. $T_{pq1}$ is the operational time associated with operation q of product p and the lowest combined-cost resource for operations belonging to product p. Find the maximum difference $D_{pq}$; the associated operation is the maximum penalty operation.

Step 5. Assign the maximum penalty operation to its minimum combined money-cost resource.

Step 6. For all other operations which pertain to the product to which the assigned operation belongs and which can be performed on the assigned resource, set combined cost equal to operational cost and set combined time equal to operational time. Reduce the available capacity for the assigned resource by the amount of time taken by the assigned operation. Check for capacity shortage for all remaining operations of all products which are compatible with this resource. Set an incompatibility flag or assign infinite or a very long time to operation-resource pairs for operations that can no longer be performed within the capacity constraints of this resource. Remove the assigned operation from further consideration for assignment in the iterative process.

Step 7. Repeat steps 3-6 until all operations are assigned or until an infeasibility is detected, i.e., no resource is available to perform a given operation. In the latter case, the heuristic has failed to provide a solution. In the former case, all operations have been assigned to resources and capacity constraints. The final assignment map is reported.

V = Cost Time Product

As with the cost-time-quotient heuristic, the cost-time-product heuristic takes both time and cost into account, but with increased emphasis on time. Hence, in practice, the cost-and-time-product-based heuristic is more similar to the time-based heuristic than to the cost-based heuristic, and is best suited for situations with very tight capacity constraints. Formally, this heuristic is the same as the cost-time-quotient heuristic except that the comparison D generated in step 4 is $(M_{pq2} \times T_{pq2}) - (M_{pq1} \times T_{pq1})$ for all operations, where the subtrahend is the second minimum capacity-qualified product and the minuend is the minimum capacity-qualified product for each operation.

V = Cost Qualified by Remaining Capacity

In the cost-capacity heuristic, cost differences are weighted by capacity constraints, which vary as assignments are made. The results of this heuristic come closer to minimum cost than to minimum time. Since this heuristic considers both cost and time (capacity), it is procedurally similar to the cost-time-quotient heuristic. The difference is in the comparison applied in step four:

$$\frac{(M_{pq2}-M_{pq1})\left(B_1 - \sum_{p=1}^{P}\sum_{q=1}^{Q} T_{pq1}X_{pq1}\right)}{(T_{pq1})}$$

$B_1$ represents the initial capacity of the lowest cost resource for operation a of product p. The double sum in the numerator represents the total time taken by other operations assigned to this lowest cost resource. Thus, the right-hand expression in the numerator represents the remaining capacity available to the lowest cost resource. Note that the indices p and q in the double summation are in italics to distinguish them from the indices p and q outside the double summation.

Combining Results

Generally, the five parameters and heuristics described above generate five different solutions. Since some of the heuristics may fail to find a existing solution, the use of multiple parameters increases the probability that at least one solution will be found. Of course, if the problem is infeasible, none of the heuristics will yield a solution. In addition, the use of multiple heuristics increases the likelihood that a near optimal solution will be found. Each solution will result in an associated total money cost and a total time, making selection of a best result among the five rather straightforward. No ad hoc juggling of results is required to make this selection.

Generalized ADRAM Heuristic

The foregoing heuristics are formalized in the form that is best suited for the objective of minimizing expression 1. However, a different formalization is required to provide the full generality of the ADRAM. The first step is to divide all operations into two sets, assigned operations and unassigned operations. Each of these sets has a whole number of elements at any given time. Each assignment of an operation to a resource transfers one operation from the unassigned set to the assigned set. The assigned set corresponds to an assignment map $A_a$ of operation-resource pairs $A_{pqr}$. The assignment of a given unassigned operation to a resource has an associated complex cost $C_{apqr}$, which is a function of the current assignment map $A_a$, the $q^{th}$ operation of product p, and the resource r to which the operation is assigned. Complex cost, as indicated above, is a two-dimensional construct encompassing money-cost and time-cost. Thus, an equivalent formalization can address complex cost implicitly by referring to simple cost and time.

In the examples given above, the assigned sets and the assignment maps have been unordered. In other words, the dependence of the effectiveness-related parameter depends only on the contents of the assignment map. The invention also provides for assignment dependence where the parameter is a function not only of the contents of the assignment map but also on the order in which the operation-resource pairs were entered into the assignment map.

The optimization achieved by ADRAM is dependent on the parameter selected to evaluate operation-resource pairs, the intra-operation comparison function used to measure differences between pairs associated with the same operation, and the inter-operation comparison function used to select a "worst" penalty to avoid.

The parameter is selected to be a function of complex cost. As such, it can be a function of money-cost alone, time alone, or a combination of time and money. Furthermore, the parameter should be selected so that a best and a second best value can be identified. In all the foregoing examples, the lowest value was the best value. However, ADRAM works just as well by taking the inverse of each value and selecting the highest value as the best. More generally, the best, or most "profitable" value can assume positions other than highest or lowest. In any case, any parameter for which best values can be determined can be converted to a parameter in which the best values are the lowest. Hence, it is sufficient to require that the parameter be selected so that best is lowest, requiring alternative formalizations be mathematically equivalent.

Parameter selection determines which resource is the best resource and which is the second best resource. Selection of the comparison function determines how the worst penalty is determined. The first comparison is an intra-operation comparison function used to measure the penalty involved in selecting the second best resource instead of the best resource for a given operation. Subtraction is used above in conjunction with the time, cost, and time-cost-product parameters discussed above. While subtraction is usually considered an operation rather than a function, it can be considered a function of the form $z=f(x,y)$ where y is the minuend, x the subtrahend, and z the difference. The comparison functions for the cost over set-up time and the cost-and-remaining capacity heuristics were used with more complex intra-operation comparison functions.

Once the intra-operation comparisons are made, it is necessary to select the inter-operation comparison corresponding to the greatest penalty. With proper selection of the parameter and the intra-operation comparison, this will simply be the greatest intra-operation comparison value. On the other hand, it is possible to use inter-operation comparisons other than a maximum to determine worst penalty. However, formulations using such inter-operation comparisons can be shown to be mathematically equivalent to the claimed formalizations using only maximums.

The methods described above are applied to resource allocation. The can be applied for any planning period or set of jobs. The speed and economy with which solution can be attained permits their application to short-term planning problems which could not be solved previously using conventional methods. In addition, longer term problems which where too expensive to solve can be addressed economically by ADRAM.

The present invention can also be used for several other related purposes. For example, the methods are useful for determining which resources should be purchased. Capital purchase decisions can be implemented by including in the initial cost associated with an operation-resource pair the purchase price of a resource, e.g., machine. Once that resource has had an operation assigned to it, the purchase price of the resource is eliminated from consideration in determining maximum penalties in the assignment of other operations. Thus, ADRAM accommodates "fixed-cost" considerations, as well as set-up cost. On a larger scale, ADRAM can be used for factory design. In addition, ADRAM can be used to choose between making and buying certain products.

In addition to handling relatively conventional formalizations where cost is to be minimized subject to time-capacity constraints, the invention also handles different problem definitions. For example, time can be minimized subject to cost limitations on the use of particular resources. The foregoing embodiments, modifications thereto, and variations thereupon are provided for by the present invention, the scope of which is limited only by the following claims.

What is claimed is:

1. A method of allocating processing resources to maximize complex-cost-effectiveness, wherein plural products, each requiring at least one processing operation, are to be processed on plural processing resources, each of said operations being performable on at least one of said resources, each of said operations belonging at any given time to one of two sets, an assigned set and an unassigned set, said assigned set including all operations which have been assigned to resources, said unassigned set including all operations which have not been assigned to resources, said assigned set including a whole number of elements, said unassigned set including a whole number of elements, said assigned set defining an assignment map the elements of which are operation-resource pairs, each operation-resource pair including an operation and the resource to which it has been assigned; said method comprising the following series of steps and mathematic equivalents thereof:

1) attributing a complex cost to each potential assignment of an unassigned operation to a resource, said complex cost including a money-cost and time-cost, the complex cost for each operation-resource pair being a function of and varying according to the assignment map existing at the time of the potential assignment;

2) evaluating potential assignments according to a parameter to obtain a respective parameter value, the magnitude of said parameter value negatively correlated to said effectiveness, said parameter being a function of complex cost, said parameter having an associated comparison function which can be used to compare two parameter values so that a comparison value is obtained, the magnitude of said comparison value providing a measure of differences in effectiveness;

3) determining a most effective resource for each of said unassigned operations, said most effective resource being the resource belonging to the potential assignment with the lowest parameter value for a given operation, also identifying a second most effective resource for each of said unassigned operations, said second most effective resource being the resource belonging to the potential assignment with the second lowest parameter value for a given operation;

4) identifying a maximum penalty operation by comparing parameter values of the most effective resource and the second most effective resource for each operation according to said comparison function to obtain a respective comparison value, then selecting the operation associated with the maximum comparison value;

5) assigning said maximum penalty operation to its most effective resource, changing assignment maps by changing the status of said maximum penalty operation from unassigned to assigned;

6) re-evaluating those of said parameter values affected by changes in complex costs due to the immediately preceding change in assignment maps;

7) iterating steps 3-6 until all operations are assigned;

8) allocating resources in correspondence with the assigned operations;

9) moving the products to the respective allocated resources; and 10) performing the assigned operations on the products by means of the respective allocated resources.

2. A method of allocating plural processing resources in the processing of plural products, plural operations being required for the processing of said products, each of said products requiring at least one associated operation of said operations, each of said operations belonging to one of said products, said operations at any given time being classifiable into two sets including an assigned set of operations which have been assigned to resources to define operation-resource pairs and an unassigned set of operations not assigned to resources, said assigned set defining a respective assignment map of operation-resource pairs, each operation-resource pair having a respective operational cost and a respective operational time, each operation-resource pair having an associated product-resource pair where the operation of the operation-resource pair belongs to the product of the associated product-resource pair, each product-resource pair having a respective set-up cost and a respective set-up time, said method comprising:

1) attributing a combined cost and a combined time to each potential assignment of an unassigned operation, the combined cost for a given operation-resource pair being the sum of the respective operational cost and the set-up cost associated with the associated product-resource pair, unless another operation belonging to that product has been previously assigned to said resource, in which case said combined cost for the given operation-resource pair equals its operational cost, the combined time for a given operation-resource pair being the sum of the respective operational time and the set-up time associated with the associated product-resource pair, unless another operation belonging to that product has been previously assigned to said resource, in which case said combined time for the given operation-resource pair equals its operational time;

2) evaluating each potential operation-resource pair according to a parameter which is a function of and correlates positively with at least one of cost and time, the evaluation of each potential operation-resource pair yielding a respective parameter value, said parameter having a corresponding comparison function for comparing parameter values, said comparison function yielding a comparison value when applied to a pair of parameter values;

3) determining a lowest value resource and a second lowest value resource for each operation, the lowest value resource for a given operation being the resource associated with the potential operation-resource pair having the lowest parameter value of the parameter values for operation-resource pairs including the given operation, the second lowest value resource for a given operation being the resource associated with the potential operation-resource pair having the next-to-lowest parameter value of the parameter values for operation-resource pairs including the given operation;

4) identifying a maximum penalty operation by comparing the lowest and second lowest parameter values for each resource according to said comparison function to yield a comparison value for each unassigned operation, the maximum comparison value among all unassigned operations identifying and belonging to said maximum penalty operation;

5) assigning said maximum penalty operation to its lowest cost resource, transferring said maximum penalty operation from said unassigned set to said assigned set, and revising said assignment map accordingly;

6) re-evaluating the remaining potential operation-resource pairs according to said parameter as required by the assignment of step 5;

7) serially assigning operations to resources by iterating steps 3–6 until all operations have been assigned to resources;

8) allocating resources in correspondence with the resource assignment;

9) moving the products to the respective resources; and 10) performing the assigned operations on the products by means of the respective allocated resources.

3. The method of claim 2 wherein said parameter is capacity qualifed combined cost.

4. The method of claim 3 wherein said comparison function yields a difference in parameter values.

5. The method of claim 3 wherein said comparison function yields a difference in parameter values divided by an operational time.

6. The method of claim 2 wherein said parameter is capacity-qualified combined time and said comparison function yields a difference in parameter values.

7. The method of claim 2 wherein said parameter is a capacity-qualified product of cost and time and said comparison function yields a difference in parameter values.

* * * * *